United States Patent
Ohta

(10) Patent No.: US 7,231,435 B2
(45) Date of Patent: Jun. 12, 2007

(54) NETWORK SYSTEM, INFORMATION PROCESSING APPARATUS, INFORMATION PROCESSING METHOD, AND CONTROL PROGRAM

(75) Inventor: Satoshi Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

(21) Appl. No.: 10/281,197

(22) Filed: Oct. 28, 2002

(65) Prior Publication Data
US 2003/0084132 A1   May 1, 2003

(30) Foreign Application Priority Data
Oct. 29, 2001   (JP) ............... 2001-330859

(51) Int. Cl.
G06F 15/177   (2006.01)
G06F 9/00   (2006.01)

(52) U.S. Cl. .................. 709/221; 358/1.1; 713/1

(58) Field of Classification Search .......... 709/203, 709/222, 221; 717/178; 713/1; 715/526; 358/1.15, 1.9, 1.1; 719/327
See application file for complete search history.

(56) References Cited

U.S. PATENT DOCUMENTS

| | | | |
|---|---|---|---|
| 6,202,147 B1 * | 3/2001 | Slaughter et al. | 713/1 |
| 6,348,971 B2 * | 2/2002 | Owa et al. | 358/1.15 |
| 6,445,462 B2 * | 9/2002 | Aritomi | 358/1.9 |
| 6,789,111 B1 * | 9/2004 | Brockway et al. | 709/222 |
| 6,842,766 B2 * | 1/2005 | Brockway et al. | 709/203 |
| 6,895,553 B2 * | 5/2005 | Wiley et al. | 715/526 |
| 2002/0010806 A1 * | 1/2002 | Yamade | 719/327 |
| 2003/0066066 A1 * | 4/2003 | Nguyen et al. | 717/178 |

FOREIGN PATENT DOCUMENTS

| | | |
|---|---|---|
| JP | 10-181161 | 7/1998 |
| JP | 11-175267 | 7/1999 |
| JP | 2000-194628 | 7/2000 |
| JP | 2001-43037 | 2/2001 |
| JP | 2001-216246 | 8/2001 |

* cited by examiner

*Primary Examiner*—Jungwon Chang
(74) *Attorney, Agent, or Firm*—Fitzpatrick, Cella, Harper & Scinto

(57) ABSTRACT

As an example of the present invention, for example, there is disclosed an information processing apparatus which communicates with a client device to which a peripheral device is connected including: a management program for managing installation configuration information generated when driver information for control of the peripheral device is installed in a system; and a transmission control program for controlling a process of transmitting information about storage space of installation configuration information managed by the above described management unit, and information about storage space of a driver information setting module for installation of driver information in response to a request of the client device.

20 Claims, 12 Drawing Sheets

▲ When no virtual printer is set

▲ When update is performed without server name

NETWORK SYSTEM, INFORMATION PROCESSING APPARATUS, INFORMATION PROCESSING METHOD, AND CONTROL PROGRAM

BACKGROUND OF THE INVENTION

1. Field of the Invention

The present invention relates to an information processing apparatus for setting a driver and a network system.

2. Related Background Art

When an installer for setting a printer which is a preferable example of a peripheral device available by a client device is activated, it has been necessary to input various parameters such as a printer name, the location of a printer driver, an output port, etc.

Additionally, when a printing process is performed by using a print server device, a user activates a driver installer arranged in the server device, and a parameter which enables a printer to interactively operate is input according to a program. However, it is necessary for a user to be informed of various printer parameters such as a print server device, a printer name, the location of a driver, an IP address, an output port name, etc.

Furthermore, in a print system in which a client device is connected to a network, there is a technology of outputting the information input into a driver installer as a file to the client device when a printer is set by the above mentioned driver installer. When the same type of printer driver is installed again, there is a technology of setting a driver by a client device according to the installation information without inputting again the installation information.

When a driver is installed, inputting complicated information has been required, and common users have difficulty in the installing process. For example, in setting a printer driver which is a preferable example of a driver of a peripheral device, it is necessary to input into a driver installer various complicated information such as port information, an IP address, the storage space of a driver, etc. In addition, an increasing number of peripheral devices have been connected to server devices through a network. Therefore, a number of users of a client device have earnestly requested to use the installation configuration information about the driver containing the information input in a specific server device when the driver is installed. However, in the client device, there is no method of using the installation information on the server device, and the users have the problem that they have to input the complicated information when a driver is installed.

Furthermore, it is also possible to store a once input parameter as installation configuration information, and to publish it in a predetermined shared directory of the server device. However, in this method, it is necessary for a user who sets up a driver to always know the location of the installation configuration information in the network. Additionally, when the configuration and the contents of a shared directory of the server device are changed, it is necessary to notify all client devices of the change. In this case, there can be the problem that, for example, no notification of a change in installation configuration information is mistakenly provided for a user who uses the changed printer.

SUMMARY OF THE INVENTION

The present invention has been achieved to solve at least one of the problems, and aims at providing a system for obtaining and using the installation information on the server device to prevent the user from performing a complicated operation when a driver is set up for the client device.

When a driver is installed in the client device, the client device is notified of the storage space of an installation configuration file arranged in a predetermined server device for use by a driver installer by preventing the process of inputting complicated information including the installation configuration information.

Furthermore, to attain the above mentioned purpose, the present invention also aims at providing a system for inputting installation configuration information into a driver installer so that an installer corresponding to a peripheral device can recognize the installation configuration information without forcing a user to perform a complicated operation.

The present invention includes the following means to attain at least one of the above mentioned purposes.

As an aspect of the present invention, for example, an information processing apparatus communicating with a client device to which a peripheral device is connected is disclosed as including a management program for managing the installation configuration information generated when the driver information for controlling the peripheral device is installed in the system, the information indicating the storage space of the installation configuration information managed by the management means in response to the request from the client device, and a transmission control program for control of the process of transmitting information about the storage space of a driver information setting module which is a driver information installing module.

Other features and advantageous of the present invention will be apparent from the following description taken in conjunction with the accompanying drawings, in which like reference characters designate the same or similar parts throughout thereof.

DESCRIPTION OF THE PREFERRED EMBODIMENTS

Figure 1:
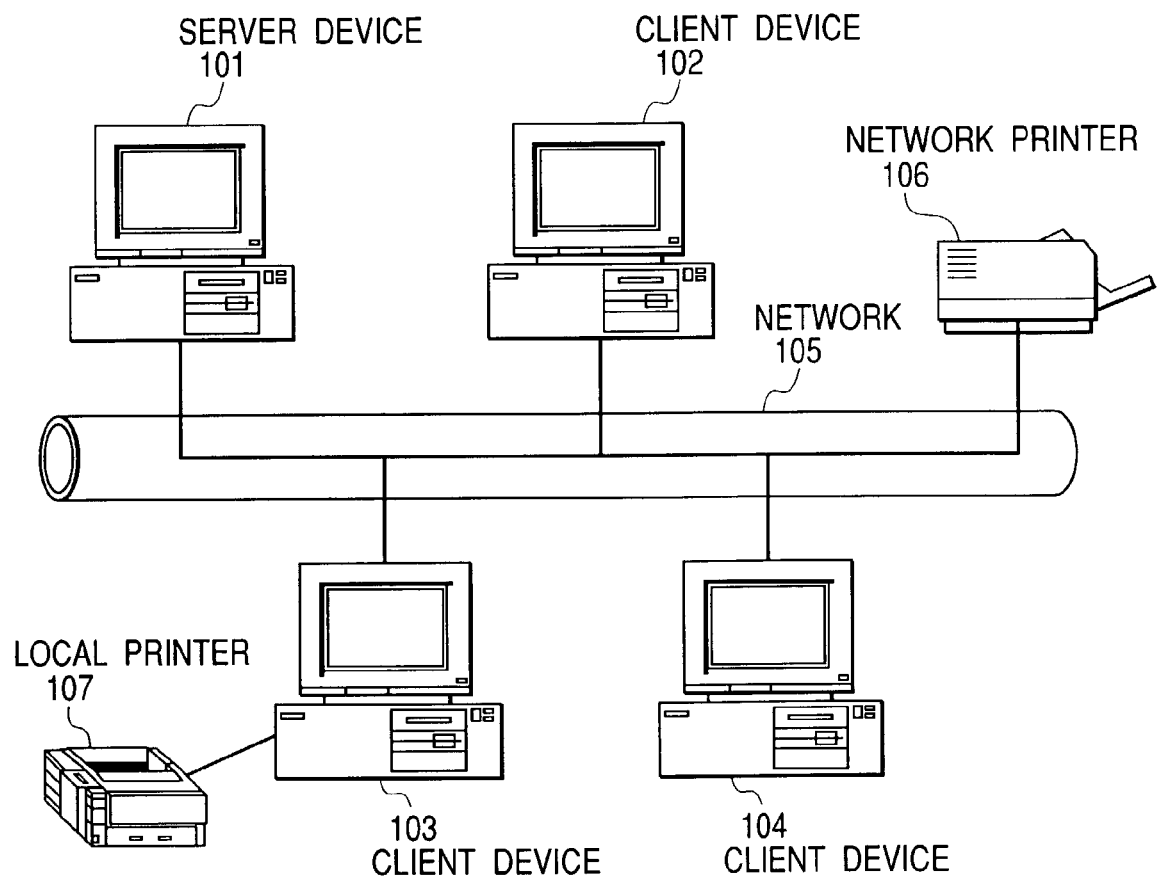
FIG. 1 shows a system configuration of a print system according to an embodiment of the present invention.

The present invention relates to a print system capable of automatically generating a printer object of the same settings in a print system in which a plurality of client devices share a network printer through a virtual printer defined in a server device by generating an existing installation configuration file using the function of automatically installing a printer driver (installing capability of automatically generating a printer object using a stored installation configuration file storing setting information (minimal information such as a printer name, a port name, comment text, etc. used in generating a printer) from installing a printer driver to generating a printer object without any user operation) in setting a newly installed printer device and generating a printer object, sharing the installation configuration file with the installer of the printer driver on the server device machine, and activating the driver installer by each client device using the installation configuration file as a parameter.

An existing installation configuration file can be generated by the function of installing a printer driver in the shared folder in the server device through the virtual printer, the name of the installation configuration file and the UNC path name of the printer driver installer are defined as a piece of configuration information about the virtual printer, and the virtual printer can be shared among the client devices. A UNC path name is used as a preferable example. A URL such as 'http://server.co.jp/setup.exe', a preferred example of the URI (unified resource identifier), etc., can be used if it is information for identification and management of a peripheral device. An object is defined as a set of attributes (properties) by abstracting the equipment information or identification information about an actual device such as a peripheral device, etc. and the data in the memory stored in a predetermined storage area. In this system, when a client device 101 performs a printing process, print data to be printed by a printer 106 can be spooled by transmitting it from the server device. The print data can be directly transmitted to the network printer 106 after spooling it by a client, and awaiting a reply from a server device 502 managing the status of a printer.

The server device 502 can obviously manage the printing order, and specify a file on a local hard disk by specifying a path on a command line, but can also specify a file in another machine in the network. To attain this, a Microsoft network sharing service presented by Microsoft is available. A host name, a shared name, a path can be specified in the format called 'UNC' (universal naming conversion) as follows. '¥¥host name¥shared name¥path'

For example, assume that a machine 'server01' has published a driver. If the directory called 'drivers' generated in a local root directory is published with the shared name of 'public' assigned in the 'server01', a file which can be specified by the directory '¥drivers¥vendername¥driver.dll' can be accessed by specifying the UNC path as follows.

'¥¥server01¥public¥vendername¥driver.dll'

The above mentioned UNC path can be used in the system installed by the TCP/IP or the NetBEUI protocol and incorporated by a network sharing service. Specifying a file in a network by the UNC is basically available anywhere a path can be specified.

In the embodiment of the present invention, the above mentioned UNC path is used as the information indicating the storage space of various modules such as a printer driver module which is a preferable example of driver information for control of a peripheral device, a driver installer module which is a preferable example of a driver information setting module (driver information setting means), etc. The UNC path is simply an example, and any information indicating the storage space of various modules can be used. Another example of information indicating the storage space of various modules is specifying the storage space of various modules using the URI (unified resource identifier). When the URI is used, a Web server device and a Web client device (Web browser) are arranged for the server device and the client device, and the URL information which is a preferable example of a URI described by an HTML, an XML, etc. is transmitted/received using an http protocol, thereby transmitting/receiving the URL information. According to the present embodiment, the driver information setting module is incorporated into a driver module, but it can be managed as another file for transmission and reception.

The client device can refer to the virtual printer in the server device, and can operate the driver installer in an automatic install mode based on the UNC path name of a printer driver set in the configuration information of the virtual printer, and the automatic installation configuration file name. The printer driver generates a printer object which is the same as the printer object generated in the server device based on the contents of the settings stored in the installation configuration file.

Furthermore, when the client device is activated, the definition state of the virtual printer in the server device is compared with the definition state of the virtual printer in the client device. If a new virtual printer is added, the automatic generating capability of the printer object is used to synchronize it with the latest virtual printer configuration.

That is, by managing the setting information about the printer object generated in the server device as the configuration information about the virtual printer, all client devices connected to this system can constantly synchronize the printer configuration information through the virtual printer of the server device, thereby reducing the number of steps in the managing and maintaining processes.

The embodiments of the present invention will be described below by referring to the attached drawings.

FIG. 1 shows a configuration of a system of a print system according to the embodiment of the present invention. In FIG. 1, it is assumed that there are a plurality of client devices. Reference numerals 102, 103, and 104 denote client devices. They are connected to a network 105, and can execute various programs such as an application program, etc. Reference numeral 101 denotes a server device. The device is connected to the network 105 through a network cable, and manages the client device machines 102 to 104 connected to the network 105. The server device and the client device are configured by a PC which is a preferable example of an information processing apparatus. Reference numeral 105 denotes a network. The network is connected to the client device, the server device, the network printer, etc. Reference numeral 106 denotes a network printer, and reference numeral 107 denotes a local printer. Thus, the server device 101, the client devices 102, 103, and 104 share functions to perform a process of utilizing the client devices and reducing the load in the network.

Figure 2:
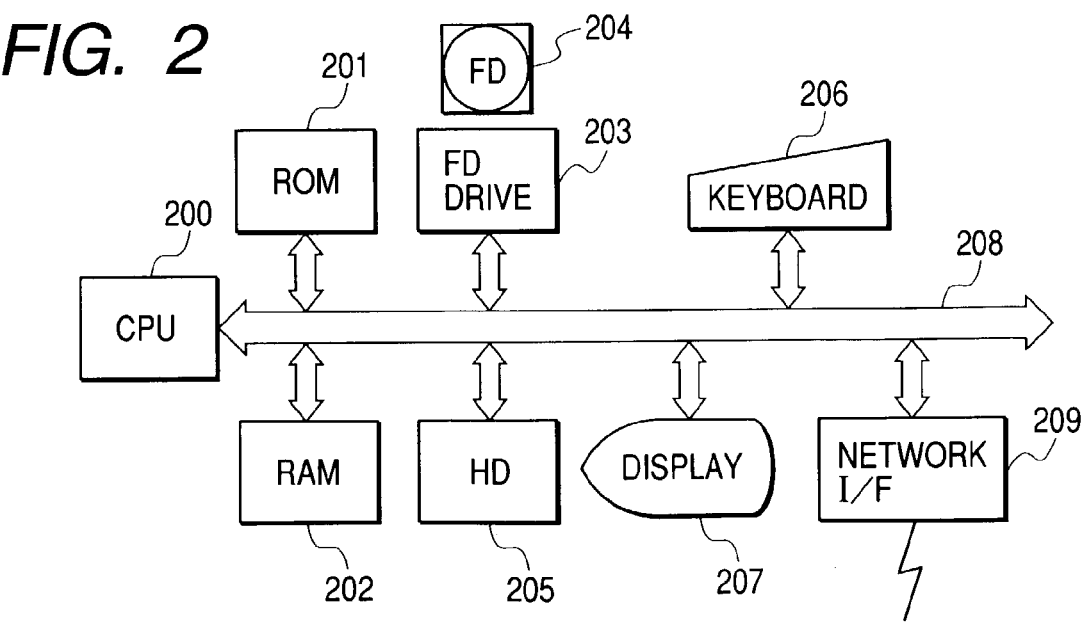
FIG. 2 is a block diagram showing an outline of a client device and a server device shown in FIG. 1.

FIG. 2 is a block diagram of an outline of configurations of the client device and the server device. The client devices 103 and 104 have the same configurations. A CPU 200 controls the execution of an application program stored on an HD (hard disk) 205, a printer driver program, an OS, a network printer control program, etc., and the temporary storage of the information, a file, etc. required in executing the programs in RAM 202. Reference numeral 206 denotes a keyboard (input means), and user uses it in inputting an instruction, etc. for a control command of a device to issue it to the client device. The keyboard is a preferable example of input means, and another input means can be a mouse, a tablet, a touch panel from a display, etc. Reference numeral 207 denotes a display (display means, input means). It displays a command input through the keyboard 206, the state of a printer, etc. The display can be, for example, a CRT, a display panel which can be a liquid crystal display, etc. Reference numeral 208 denotes a system bus. It relates to the flow of data in the client device. ROM 201 stores various data such as a program, for example, a basic I/O program, etc. the font data for use in processing a document, data for template, etc.

Figure 4:
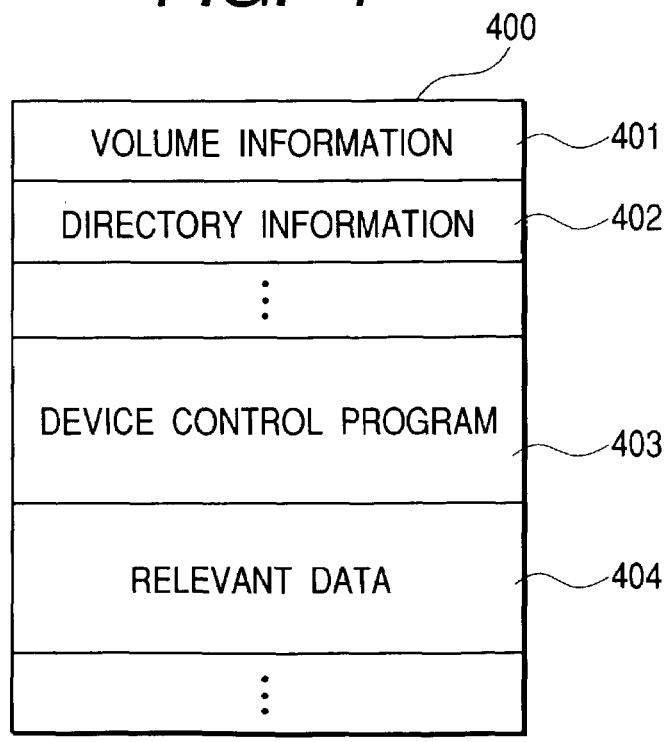
FIG. 4 is a memory map indicating data in the FD shown in FIG. 2.
Figure 5:
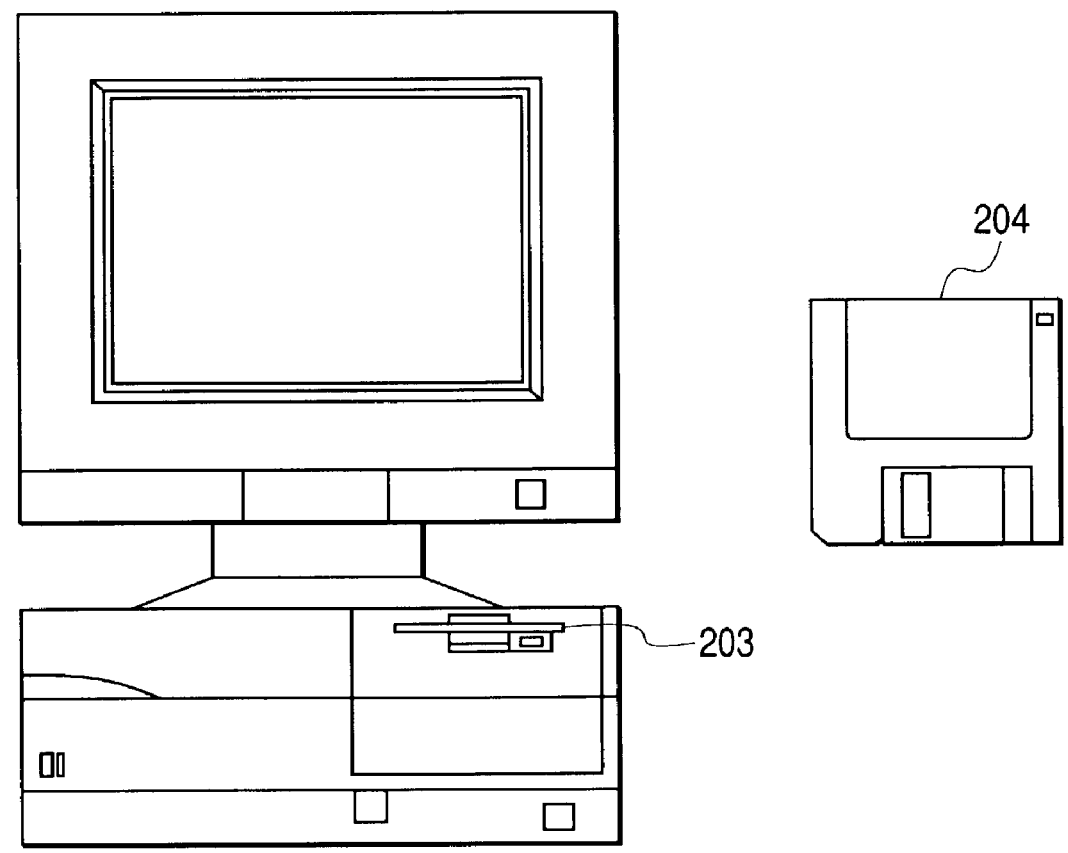
FIG. 5 shows a relationship between the client device and server device shown in FIG. 1 and the FD shown in FIG. 2.

FIG. 5 shows a relationship between the client device in FIG. 1 and the FD shown in FIG. 2. Each of the client devices 102 to 104, and the server device 101 is provided with an FD (floppy drive). Reference numeral 203 denotes an FD (floppy disc drive). It loads a computer system with a program, etc. stored in an FD 204 through the FD drive 203 as shown in FIG. 5. Reference numeral 204 denotes an FD. It stores a print system program described in the present embodiment and relevant data. FIG. 4 shows the configuration of the stored contents.

FIG. 4 is a memory map of data in the FD shown in FIG. 2. In FIG. 4, reference numeral 400 denotes the data contents of the FD 204, and reference numeral 401 denotes volume information indicating the information about the data. Reference numeral 402 denotes directory information. Reference numeral 403 denotes a print system program described in the present embodiment. Reference numeral 404 denotes the relevant data. The print system program 403 is represented in program code according to the flowchart of the print system program shown in FIGS. 7 to 10.

Figure 3:
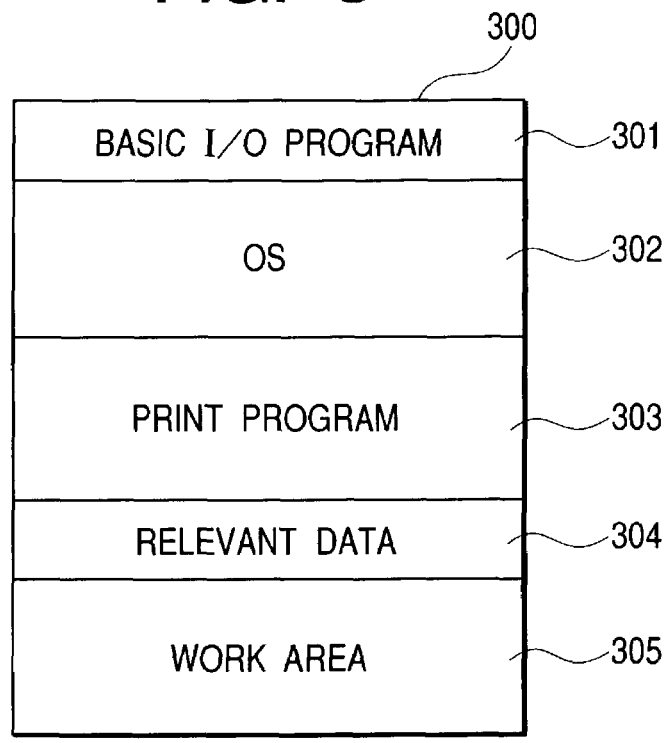
FIG. 3 is a memory map used when a program is developed from an FD shown in FIG. 4 to a RAM shown in FIG. 2.

FIG. 3 is a memory map showing the executable state of the control program of the printer loaded into the RAM 202. According to the present embodiment, the print system program and the relevant data are loaded from the FD 204 directly to the RAM 202 and executed. They can also be loaded from the HD 205 to the RAM 202 each time the network control program is operated through the FD 204. The medium storing the print system program can be, not only an FD, but also CD-ROM, an IC memory card, etc. Furthermore, the print system program can be stored in the ROM 201, configured to be a part of the memory map, and be executed directly by the CPU 200.

Reference numeral 301 denotes a basic I/O program. It is a program into which the OS is read from the HD 205 to the RAM 202 when the control device is turned on, and is an area containing a program having the function of IPL (initial program loading), etc. for start of the operation of the OS. Reference numeral denotes an OS. Reference numeral 303 denotes a network printer control program, and reference numeral 304 denotes relevant data. Reference numeral 305 denotes a work area in which the CPU 200 executes the print system program.

Figure 6:
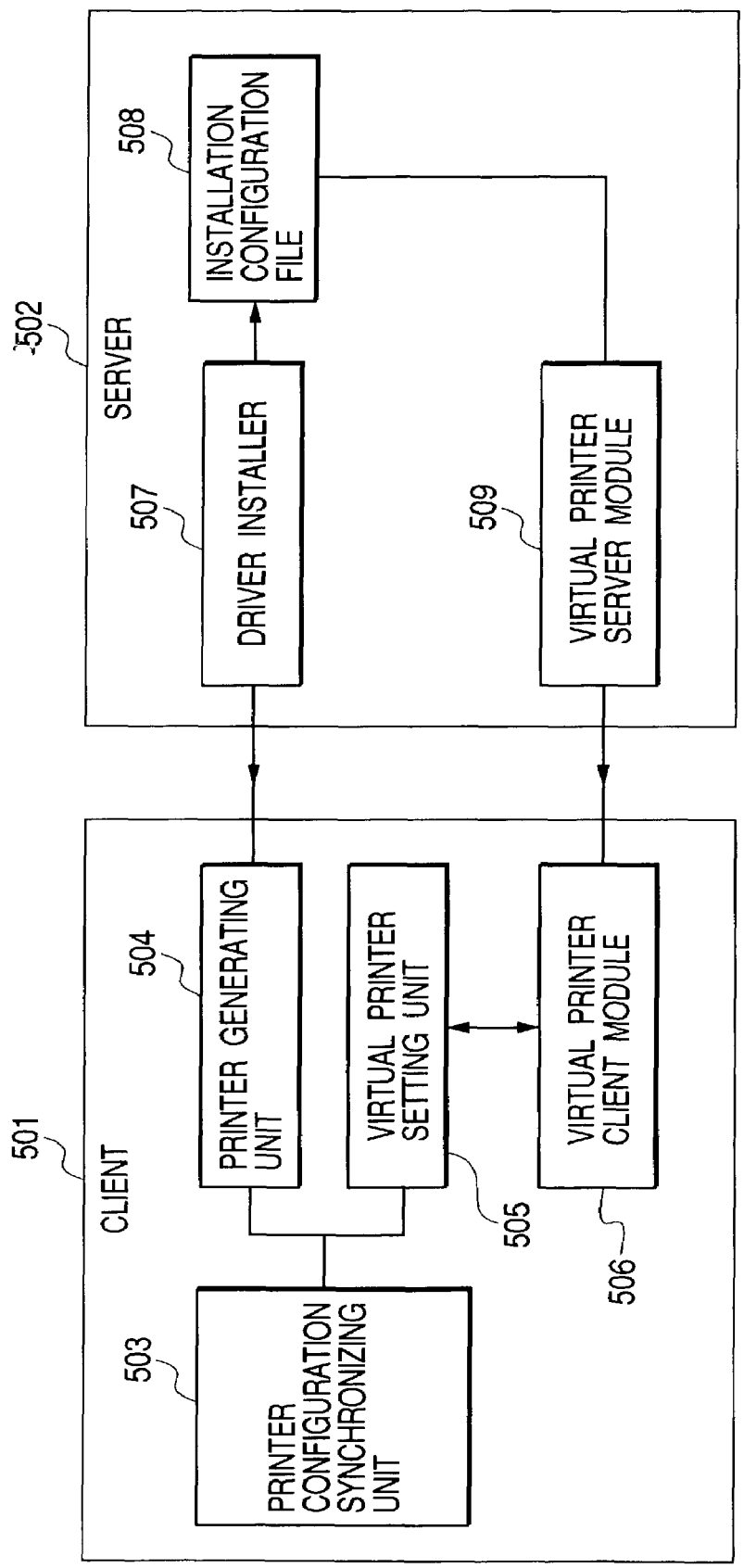
FIG. 6 is a block diagram of an outline of a configuration of the print system shown in FIG. 1.

FIG. 6 shows configurations of the software modules of the client device and the server device according to the present invention. They are provided from the FD and the server device through the network. Reference numeral 501 denotes the configuration of the program module of the client device. Reference numeral 502 denotes the configuration of the program module of the server device. Reference numeral 503 denotes a printer configuration synchronizing unit operating in the client device. The unit operates when the client device according to the present invention is activated, and synchronizes the printer configurations of the client device and the server device. Reference numeral 504 denotes a printer driver activating unit, which is one of the client device programs according to the present invention, for activating a printer driver stored in the shared folder of the server device 502. The virtual printer setting unit 505 operates with a virtual printer server module 509 (hereinafter referred to simply as a server module 509) which is management means for managing the virtual printer of the server device 502, determines the increment/decrement of the virtual printer shared and managed in the server device 502, and synchronizes a client module 506 with the server module 509 in configuration. The server module 509 which is management means manages the installation configuration file described below with the file associated with a virtual printer name (identification information) defined in the server. A user can select and instructs the installation configuration file described below to be or not to be generated when the driver is installed in the system of the server device 502. Various information relating to the installed printer driver is described in the file. At a request from the client device 501, the storage space of the installation configuration information and the storage space of the driver installer are transmitted from the server device 502 to the client device 501. The OS of the client device receives the storage space of the installation configuration information and the storage space of the driver installer. The client module 506 of the client device 501 receives the storage space of the installation configuration information and the storage space of the driver installer from the OS of the client device 501.

The client module 506 and the server module 509 can share the functions of a client and a server. They are modules for realizing a virtual printer for allowing the client device 501 and the server device 502 to share printer information. Reference numeral 507 denotes a module of a driver installer (hereinafter referred to simply as a driver installer 507) stored in the shared folder of the server device 502 including a printer driver. An installation configuration file 508 is used in an automatic install mode of the driver installer 507, and stores all necessary information for installation such as the printer name, the port name, etc. input through the installer activation user interface of the driver installer 507. The installation configuration file is a preferable example of installation configuration information, and is not necessarily to be in a file format. The server module 509 is a virtual printer managing unit for managing, sharing, and publishing the virtual printer 506. These modules configure the print system according to the present embodiment, and are provided by a storage medium, that is, the FD 204 according to the present embodiment. The storage medium can be any of other media such as CD-ROM, a smart medium, etc.

First Embodiment

A printer, which is a preferable example of a peripheral device, is described below according to the present embodiment. However, a peripheral device includes equipment such as a digital camera, a scanner, etc. A printing device and an image forming device are also preferable examples of a peripheral device. An image forming device includes a copying machine, a facsimile, an ink jet printer, a laser printer, and a combination of any of them.

A virtual printer is generated in the server device 502 shown in FIG. 6. The name of the virtual printer is input using the input means such as the keyboard 206 of the server device, a mouse, etc., and read to the registry area of the OS 302.

Then, a port of the virtual printer is generated. In this process, the port name of the virtual printer is set as 'VPS-MACHINE@VPS-PRINTER'. Corresponding to the output port name of the virtual printer, an actual output port of data is set. Here, a UNC path name of the printer is specified as an output port. Otherwise, a combination of the TCP port information (for example, lpr) and an IP address, which is a preferable example of a network address of an existing printer, can be specified as an output port (a TCP port is different in concept from an output port). Then, the virtual printer is associated with the UNC path indicating the storage space of the driver, and stored as virtual printer configuration information in the HD 205 of the server device.

Then, the virtual printer generated in the client device 501 is set. A printer object of the virtual printer is generated using an OS command A, and the output port corresponding to the object is specified in the generated port 'VPS-MACHINE@VPS-PRINTER'. The 'VPS-MACHINE' is a server device name, and the VPS-PRINTER is a virtual printer name.

As described above, only by specifying the server device which defines the virtual printer, and the virtual printer name, a printing process is performed for the actual output port specified by the port of the virtual printer. That is, the user of the client device can use the virtual printer as if it were an actual printer for performing a printing process and displaying a job. When a printing process is performed on the virtual printer, the printing process is performed on the actual printer device of the virtual printer. The virtual printer is a printer object obtained by abstracting combined information of the UNC path of the actual printer or the actual TCP port (for example, an lpr port) of the printing device, and identification information (for display, an IP address) for identification of a printer and concealing it from the user so that it is not necessary for the user to be aware of the information. The virtual printer object can be shared in a network. The configuration information of the virtual printer stores various configuration information described later. Using the virtual printer, only the setting of the server device is changed when the IP address of the network printer is changed, and the user does not have to change the settings of the printer. Thus, the virtual printer conceals the physical properties of the information about an output port from the client device. When the actual printer configuration is physically changed on the server device, only the virtual printer configuration of the server device can be changed, and the physical change of the printer configuration of the server device can be concealed from the client device.

However, when the virtual printer object managed by the server device is generated and set on the client device side, a driver installing process is performed. At this time, the virtual printer port settings (for example, the character string of 'VPS-MACHINE@VPS-PRINTER' is input into the client device) are required. When a new printer is generated or a printer name is changed, the information is transmitted to the user, and the user has to input again the information on the client device 501. According to the present embodiment, when a virtual printer is generated and used, and necessary settings are performed on the client device, the above mentioned information to be input on the client device can be considerably reduced, and the printer is available without inputting complicated installation configuration information.

Figure 7:
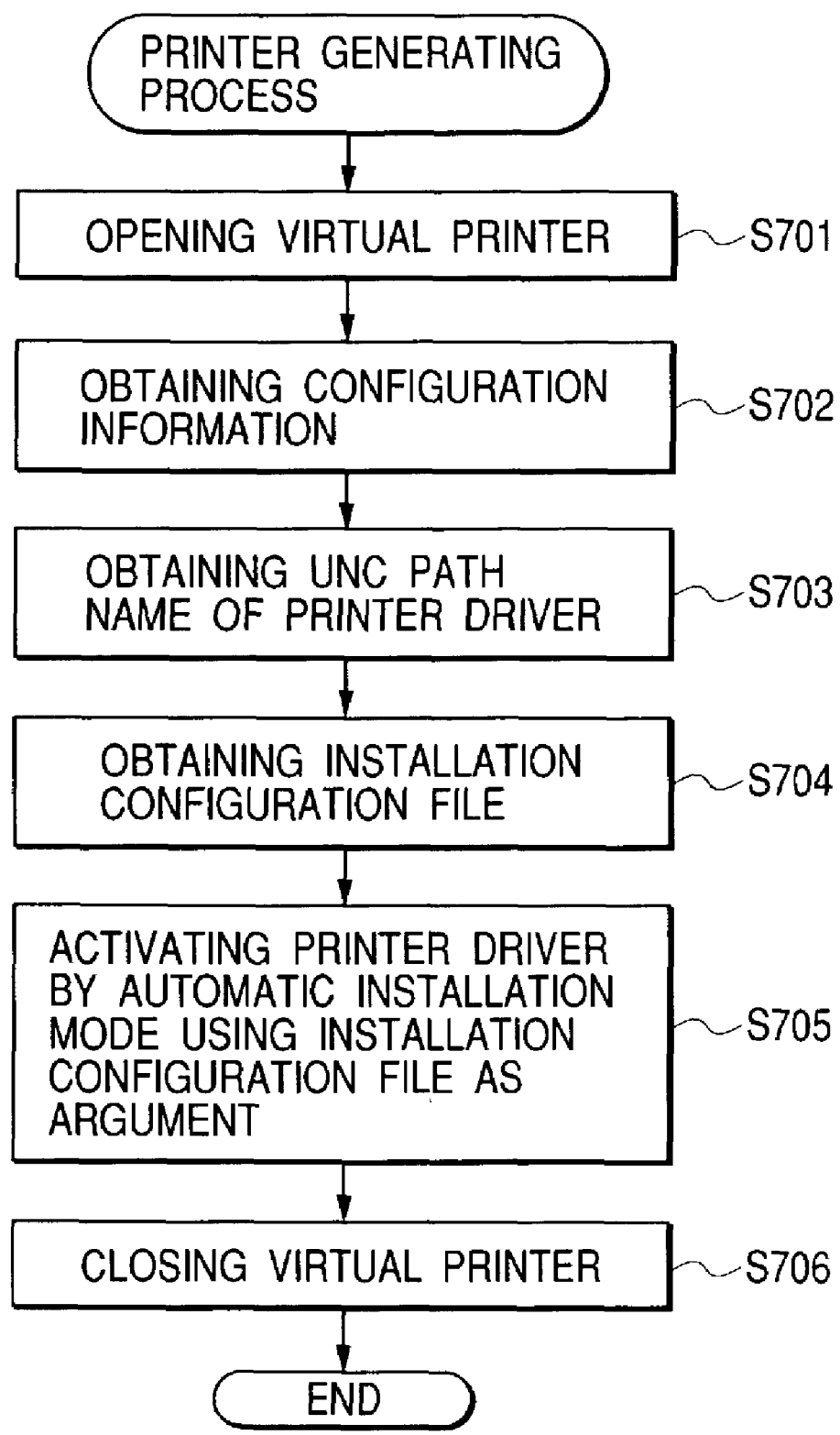
FIG. 7 shows a process in a printer generating unit 504 in a client device 501.

Described below will be an example of a method of successfully reducing the amount of input information in the client device 501 in the process of generating a virtual printer object. FIG. 7 shows a process of the printer generating unit 504 in the client device 501, and the process of automatically generating a printer object by activating a driver installer in the automatic install mode activation (silent install mode) based on the UNC path name of the printer driver installer obtained from the configuration information about the registered virtual printer, and the installation configuration file which is a preferable example of installation configuration information.

First, in step S701, the client device 501 issues to the server device an instruction to open the virtual printer specified and managed by the specified client module 506. In step S702, the server module (transmission control means) of the server device which receives the instruction to open a virtual printer controls the OS to transmit the virtual printer configuration information defined in the client module 506 through the network interface (transmission means). On the other hand, the OS of the client device 501 receives the transmitted configuration information about the virtual printer through the network interface (reception means). The driver installer 507 (acquisition control means) obtains the received virtual printer configuration information from the OS.

The configuration information stores, in addition to the necessary items in the printing process, the UNC path name of the driver installer 507, and the path name of the installation configuration file 508 referred to when the driver installer 507 is in the automatic install mode. For example, the information is transmitted in the following format. Described below is the description in the UNC path format.

'¥¥ccivps20¥public¥setup-s¥¥ccvps20¥public ¥setup.iss'

The first half of the description '¥¥ccivps20¥public¥setup' is the information about the storage space of the driver installer. In this example, the information indicates that the driver installer is stored as a program name of 'setup' arranged in the shared directory of 'public' in the server device named 'ccivps20' in the network. According to the present embodiment, the module of 'setup' includes the driver module (driver information), but it can be transmitted as separate files.

The central portion of '-s' is a flag specifying that the driver installer is activated in the automatic install mode. The last half of the description '¥¥ccivps20¥public¥setup.iss' is the information about the storage space of the installation configuration file, and indicates that the setup.iss file of the highest directory in the 'public' in the shared directories is to be read.

That is, as the initial value of the item specifying the driver to be input by the user when the driver controlling a peripheral device is installed, the '¥¥ccivps20¥public¥setup' indicating the position storing the driver installer (driver information setting module) obtained by the client module (acquisition control means), and the information of '¥¥ccivps20¥public¥setup.iss' indicating the position storing the installation configuration information to be read by the driver installer are set. Then, the driver installer 507 in the server device 502 is received by the OS (omitted in the attached drawings) of the client device 501. The client module 506 obtains the driver installer received from the server device through the OS, and activates the driver installer. The activated driver installer reads the contents of 'setup.iss', and controls the OS to automatically set the port information and the driver name, etc. in the driver at driver installation time.

In this example, since the storage space of the driver installer and the storage space of the installation configuration information is the same directory, the first half '¥¥ccivps20¥public¥' of the '¥¥ccivps20¥public¥setup.iss' can be omitted. That is, '¥¥ccivps20¥public¥setup-ssetup.iss' can be acceptable.

The installation configuration file 508 (setup. iss) stores the items to be input when the driver installer 507 is installed, the printer name, the port name (virtual printer name according to the present embodiment), the type of printer driver. For example, the contents of 'setup.iss' are as follows.

[CdSetPrinterEnv]

szDriverName=LASER LB930 szPortName=NC004@J80X szPrinterName=LB-930

In this example, in the installation configuration file, a virtual printer name is specified as szDriverName, a driver name is specified as szPortName, the port name of a virtual printer is specified as szPrinterName. The information is an example of information input when a driver is installed in the server device, and it is obvious that other necessary information can be stored in installing a driver.

In step S703, the client module 506 obtains a UNC path name of the driver installer 507 from the configuration information. Furthermore, in step S704, it obtains the installation configuration file 508. Then, in step S705, the installer of the driver installer 507 is activated by specifying the information indicating the storage space of the installation configuration file 508 (¥¥ccivps20¥public¥setup.iss) as a file to be read at command execution time.

That is, the position of '¥¥ccivps20¥public¥setup' in which the driver installer (driver information setting module) obtained by the client module (acquisition control means), and '¥¥ccivps20¥public¥setup.iss' which is the information about the position in which the installation configuration information read by the driver installer is stored are set as the initial value of the item specifying the driver input by the user when the driver controlling a peripheral device is installed. Then, the driver installer 507 in the server device 502 is received by the OS (omitted in the attached drawings) of the client device 501.

Then, the client module 506 obtains the driver installer received from the server device through the OS, and activates the driver installer. The activated driver installer reads the contents of 'setup.iss' and controls the OS to automatically set in the driver the port information, the driver name, etc. at driver installation time.

As a result, the driver installer 507 automatically uses as a set value the contents input through the user interface of the installer, thereby generating a new printer object without further input. Finally, in step S706, the virtual printer opened in step S701 is closed.

According to the present embodiment, the configuration information about a printer and the information stored in the installation configuration file are transmitted/received in separate files, but the information can be collectively transmitted/received.

Second Embodiment

Figure 8:
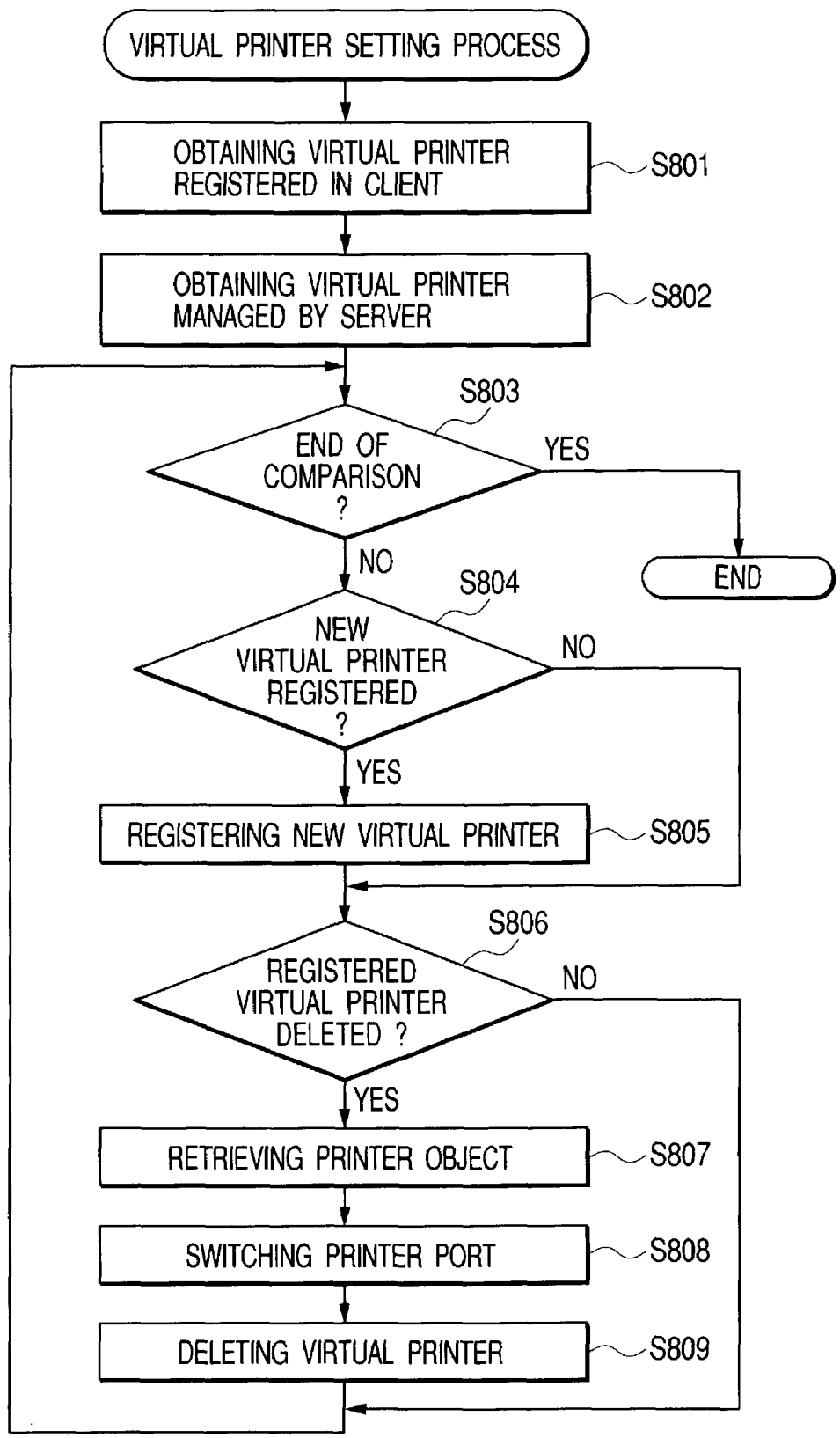
FIG. 8 shows a process in a virtual printer setting unit 505 according to an embodiment of the present invention.

FIG. 8 shows a process in the virtual printer setting unit 505 according to the present embodiment. It is the process of synchronizing the virtual printer used by the client module 506 with the virtual printer provided by the server module 509.

The virtual printer configuration information associated with the virtual printer name managed by the client module 509 on the client device 501 is equivalent to the virtual printer configuration information managed corresponding to the virtual printer name by the server module 506, and is published to the client device 501 by the server module 506.

In step S801, the client module 506 obtains all virtual printers managed by the client module 506 registered in the client device. In step S802, the client module 506 obtains all virtual printers managed as a sharing source in the server module 509. Then, in step S803, the client module 506 compares the virtual printers obtained in steps S801 and S802. As a result, if the server module 506 completes the completion of all virtual printers managed by the module, then the process of the virtual printer setting unit terminates. If there is any virtual printer not compared as a determination result in step S803, then the client module 506 determines in step S804 whether or not a new virtual printer has been added. As a result of the determination, if there is a non-registered virtual printer found in the client device 501, then the client module 506 registers the new virtual printer as a printing port of the client device 501 in step S805. Registering as a port makes the port function as an output associated with the printer object from the application of the client device 501. Then, in step S806, the client module 506 determines whether or not the virtual printer registered in the client device 501 has been deleted from the server device. If it has already been deleted from the server device as a result of the determination, then the client module 506 retrieves a printer object associating the virtual printer as a printing port in step S807. Then, in step S808, the client module 506 changes the output destination into the LPT1: provided as a standard component of the system. Thus, using the virtual printer deleted from the server device, the problem of 'uncertain output destination' in the printing process can be avoided. In step S809, the client module 506 deletes the virtual printer registered in the client device 501.

Third Embodiment

When the client device 501 is activated, the printer configurations of the client device 501 and the server device can be synchronized with each other by calling the printer generating unit and the virtual printer setting unit. First, the virtual printer setting process is performed to synchronize the virtual printer configurations of the client device 501 and the server device with each other. Then, the virtual printers whose registration has been updated in the client device 501 are listed. Subsequently, based on the listing result, the printer configurations in the server device are synchronized by calling the printer generating process described above in the first embodiment using the virtual printers whose registration has been updated. If the printer generating process has been performed on all virtual printers, then the printer configuration synchronizing process of the present invention terminates. If the printer generating process has not been completed as a result of the determination, then a printer object associated with the virtual printer as an output port is retrieved. If no printer object can be retrieved as a result of the retrieval, then a printer object is generated with the virtual printer set as an output port by activating the printer generation process. This process is repeated for each of the listed virtual printers. A printer whose output port is changed into the LPT1: because it becomes unnecessary in the virtual printer setting process is retrieved. The retrieved printer object is deleted by the client module.

As described above, according to the embodiment, the printer configuration can be automatically updated without making the user of the client device 501 be aware of the update by synchronizing the virtual printer configurations added and deleted in the server device, and automatically activating the printer driver installer stored in the configuration information of the virtual printer, thereby requiring no setting changes on the client device 501 and reducing the steps of the maintaining and managing processes.

Fourth Embodiment

Figure 9:
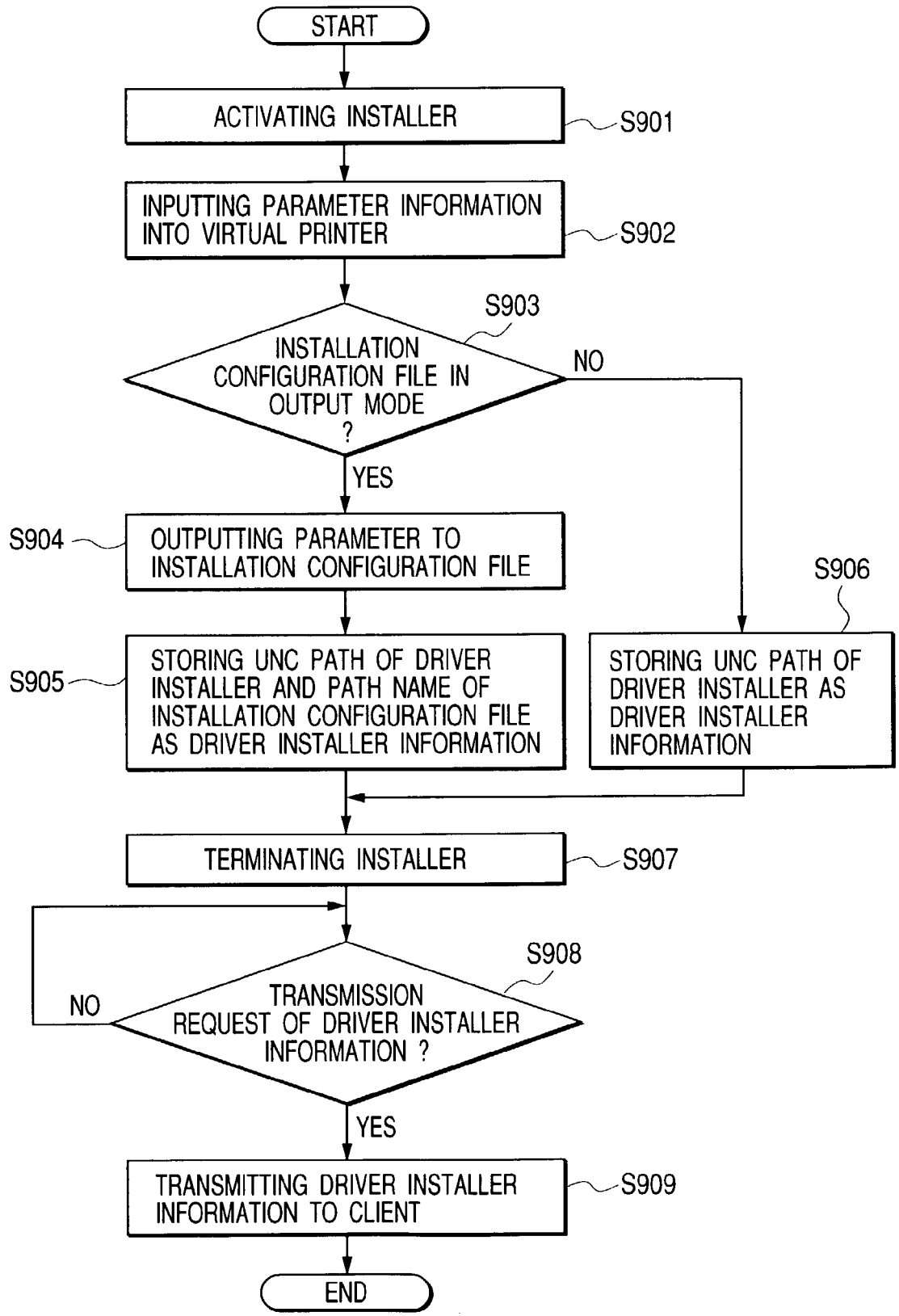
FIG. 9 shows a process of generating and transmitting an installation configuration file in a driver installer in the server device.

FIG. 9 shows the installation configuration file generating and transmitting process in the driver installer of the server device. It is assumed that the path of the driver installer is stored in advance as virtual printer configuration information of the predetermined virtual printer.

Described below will be the operation of the driver installer in the server device. When the input means of the server device operated by the user inputs an instruction to start the driver installer, and the driver installer recognizes the start instruction by the input means, the driver installer is activated (S901). The activation can be performed using a predetermined icon or by inputting a command through a command prompt. For example, at this time, if the driver installer is started by a command prompt as follows, then the driver installer is activated in the installation configuration file output mode.

¥¥csivps4¥public¥setup-r'

The driver installer is activated with the installation configuration file output mode in an off state when it is started like '¥¥csivps4¥public¥setup'.

In S902, the driver installer performs the process of inputting the value of setting information for setting a virtual printer. In the inputting process, the manager inputs a necessary item for setting a printer, for example, setting information, etc. for a virtual printer name, a driver name, a port of a virtual printer. In S903, the driver installer determines whether or not the driver installer has been activated in the installation configuration file output mode. If the determination in S903 indicates the installation configuration file output mode, then the driver installer of the server device outputs the value of the installation configuration information input in S902 and the installation configuration file in S904. Then, in S905, the UNC path of the installation configuration file and the UNC path of the driver installer are stored as driver installer information which is a part of the virtual printer configuration information, thereby terminating the installer in S907. If the determination in S903 does not indicate the installation configuration file output mode, then the UNC path of the driver installer is stored as driver installer information, thereby terminating the driver installer in S907. Then, a request to transmit virtual printer configuration information from the client device 501 is awaited (S908). When the transmission request is received, the server module 509 controls the OS to transmit the driver installer information to the client device 501, thereby terminating the process (S909).

Figure 10:
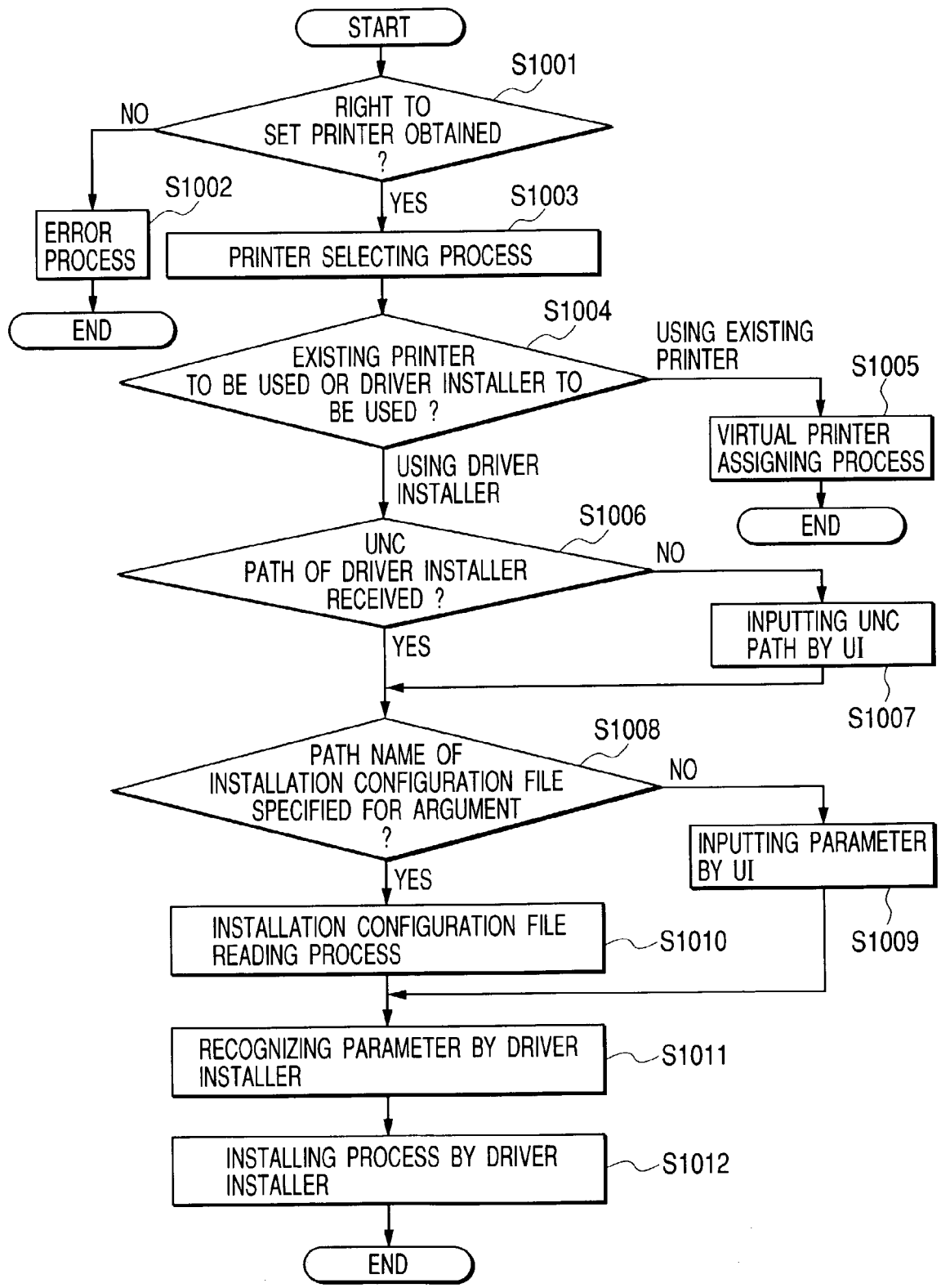
FIG. 10 is a flowchart of a virtual printer setting process in the client device 501.

FIG. 10 is a flowchart of a virtual printer setting process in the client device 501. FIGS. 11 to 14 shows the screen displayed on the client device 501 in the process shown in FIG. 10.

Figure 11:
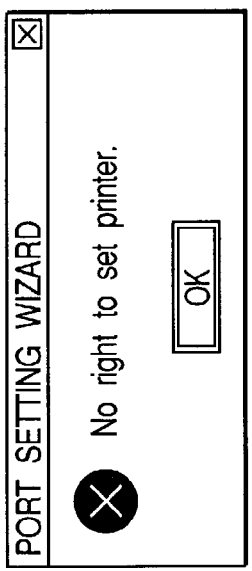
FIG. 11 shows an error screen displayed on a client device 501 in the process shown in FIG. 10.
Figure 12:
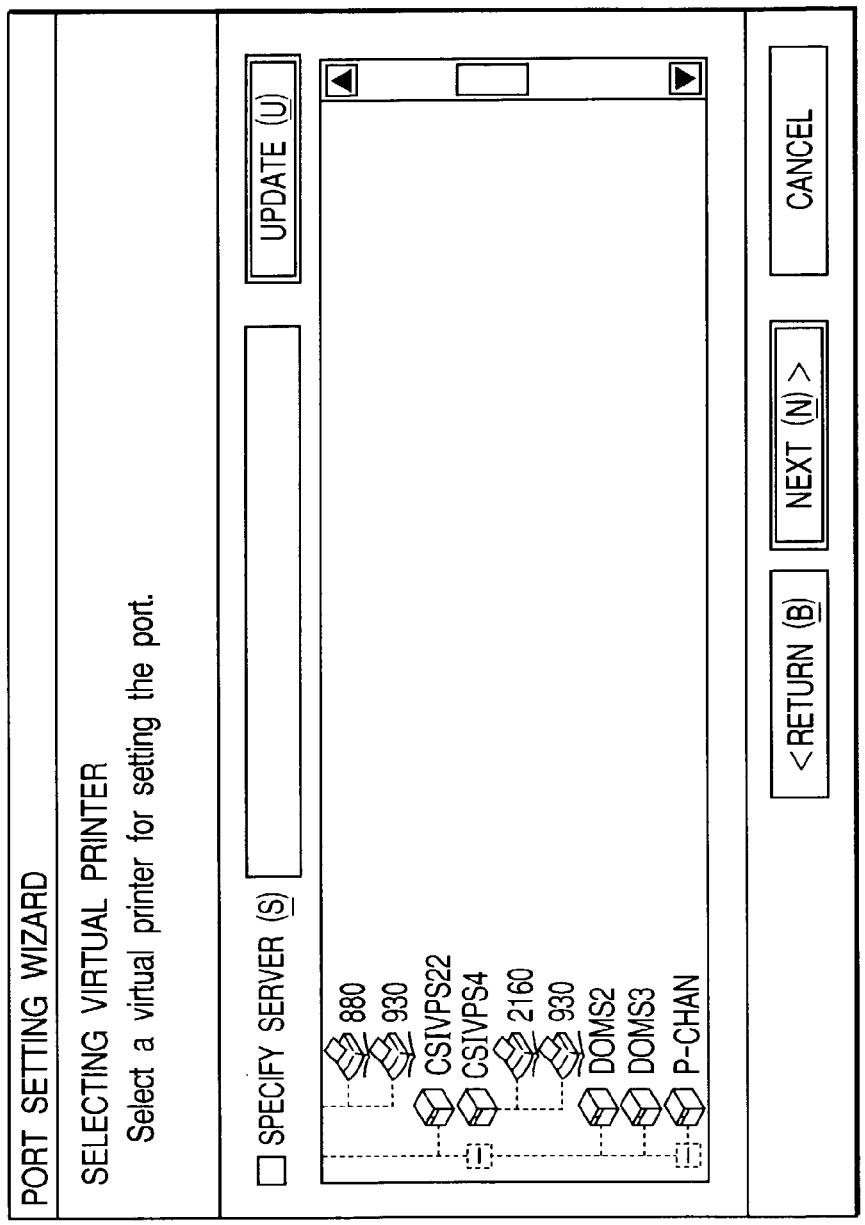
FIG. 12 shows a screen displayed on the client device 501 in the process shown in FIG. 10.
Figure 13:
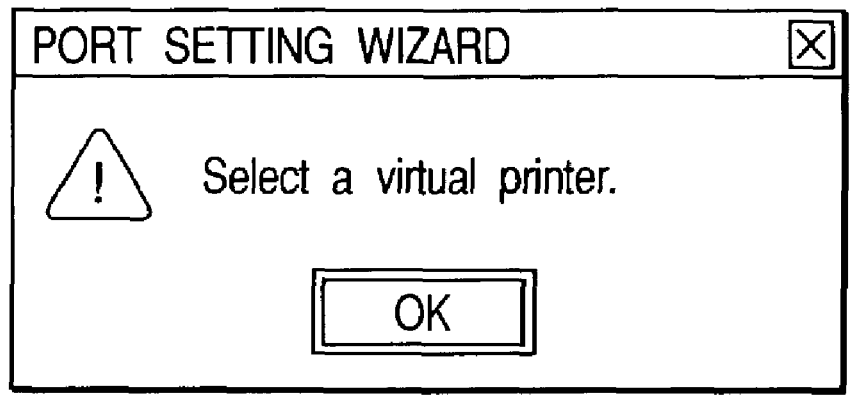
FIG. 13 shows an error screen displayed on the client device 501 in the process shown in FIG. 10.
Figure 14:
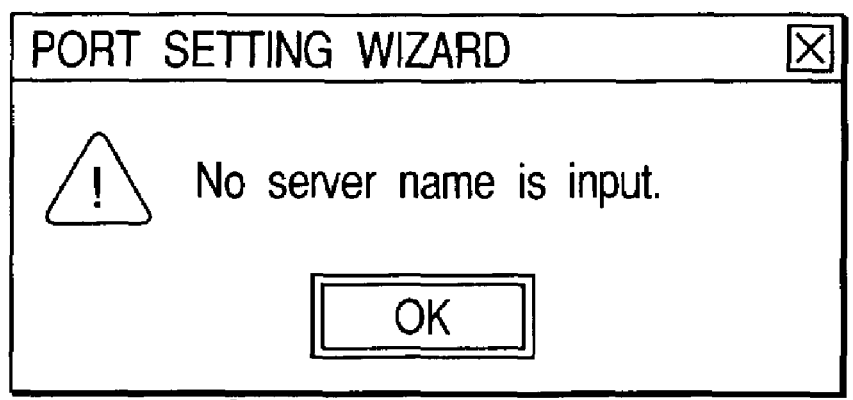
FIG. 14 shows an error screen displayed on the client device 501 in the process shown in FIG. 10.

The virtual printer process is described below by referring to the above mentioned drawings. If an instruction to generate a virtual printer in the client module 506 of the virtual printer, then the virtual printer setting unit 505 operates, and the virtual printer setting process starts. When the process starts, the client module 506 determines first in S1001 whether or not it has the right to set a printer. The determination is made based on the module (omitted in the attached drawings) of the OS of the server device 502. If the client module 506 determines based on the notification from the OS of the server device 502 in S1001 that it has no right to set a printer, then the client module issues to the OS of the client device 501 an instruction to transmit an error message as shown in FIG. 11, thereby terminating the process. If the client module 506 determines in S1001 that it has the right, then control is passed to the printer selecting process in S1003. In S1003, the client module of the virtual printer controls the OS to display the virtual printer selection screen shown in FIG. 12. FIG. 12 selects 'csivps4', and indicates the state that a printer connected to 'csivps4' is displayed. In this example, '930' is specified as a virtual printer, and 'csivps4' is specified as a print server device.

Since it is connected to 'csivps4', a selection is made by clicking on the displayed icon of the printer '930'. Otherwise, the check box of 'specify the server device' is checked, the input unit displayed to the left of the box is set active, and the UNC path name of the virtual printer can be directly input. Thus, when the selecting process is appropriately performed, the client module of the virtual printer stores the virtual printer name and the virtual print server device name in the virtual printer configuration information, and control is passed to S1004. If no print server device name is input, then the client module 506 displays the screen shown in FIG. 14. If no virtual printer is selected, then the client module 506 of the virtual printer displays the error screen shown in FIG. 13, and control is returned to FIG. 12. In S1004, the client module 506 of the virtual printer displays the screen shown in FIG. 15, and uses the printer already set in the client device as a virtual printer, or performs the process of setting a client device using a driver installer to newly set a printer.

Figure 15:
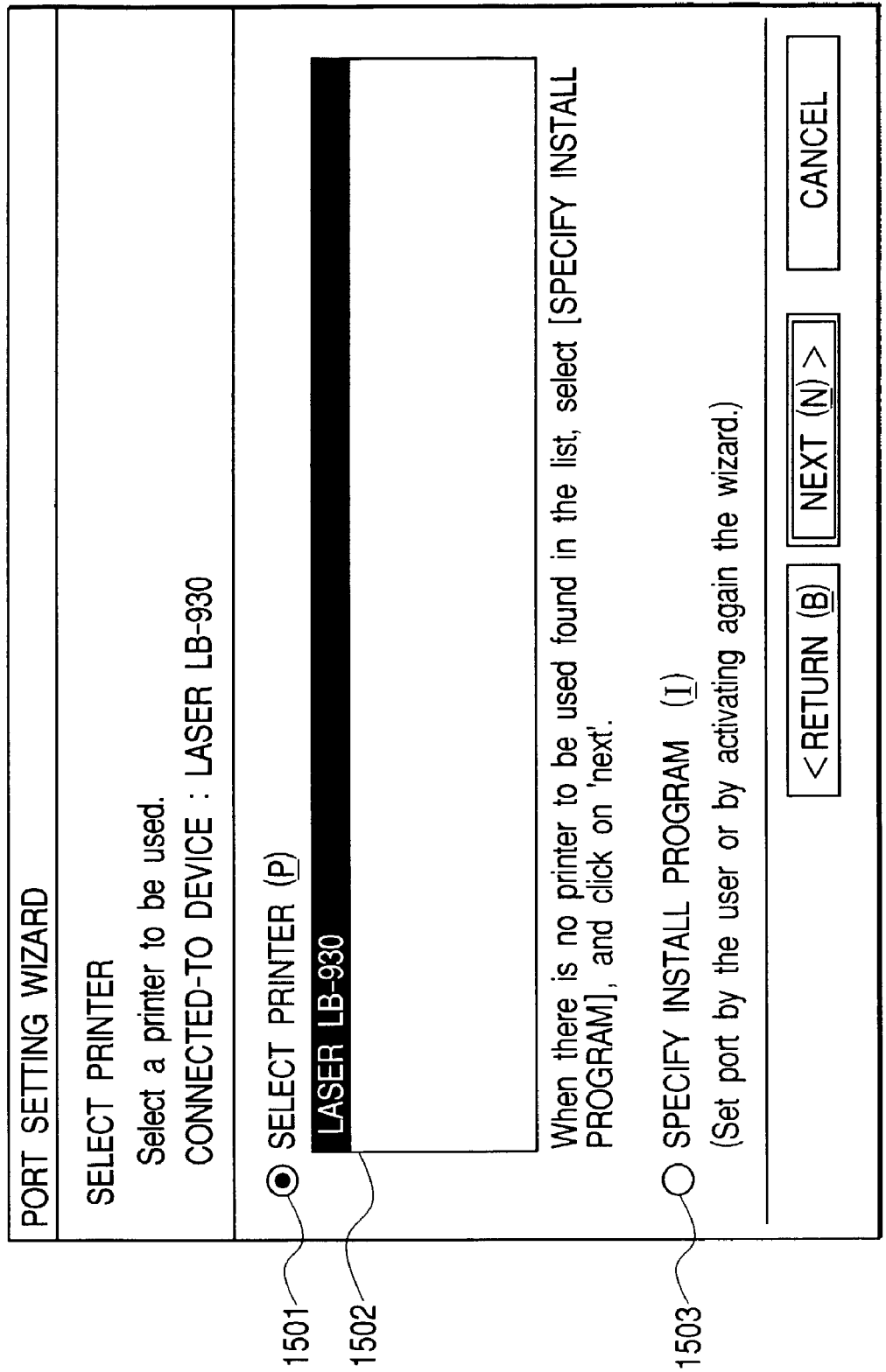
FIG. 15 shows an operation screen on which a selection is made as to which is selected, a setting of an existing printer or a driver installer.

FIG. 15 shows an operation screen on which a selection is made as to which is to be selected, an existing printer or a driver installer. Reference numeral 1501 denotes an existing printer selection unit for selecting an existing printer. Reference numeral 1502 denotes an existing printer display unit on which an existing printer, which is a printer already set in the client device 501, is displayed when the existing printer selection unit 1501 is specified. Reference numeral 1503 denotes a driver installer mode selection unit for specifying the selection of performing an installing process using a driver installer module contained in the virtual printer configuration information registered in the server device 502.

When the existing printer selection unit 1501 is selected, the process of assigning a printer already set in the client device as a virtual printer in S1005, the virtual printer configuration information is updated, and the process terminates. Then, if the user inputs in S1004 the specification of an install program (setting a new printer driver in the client device using a driver installer) for the virtual printer configuration module, control is passed to S1006.

The client module 506 determines in S1006 whether or not a driver installer path has been received. If it is determined in S1006 that no UNC path has been received, a UNC path is manually input using a keyboard, etc. into the installer path setting unit which is empty in an installer path setting unit 1602 of the user interface (UI) shown in FIG. 16, thereby passing control to S1008.

Figure 16:
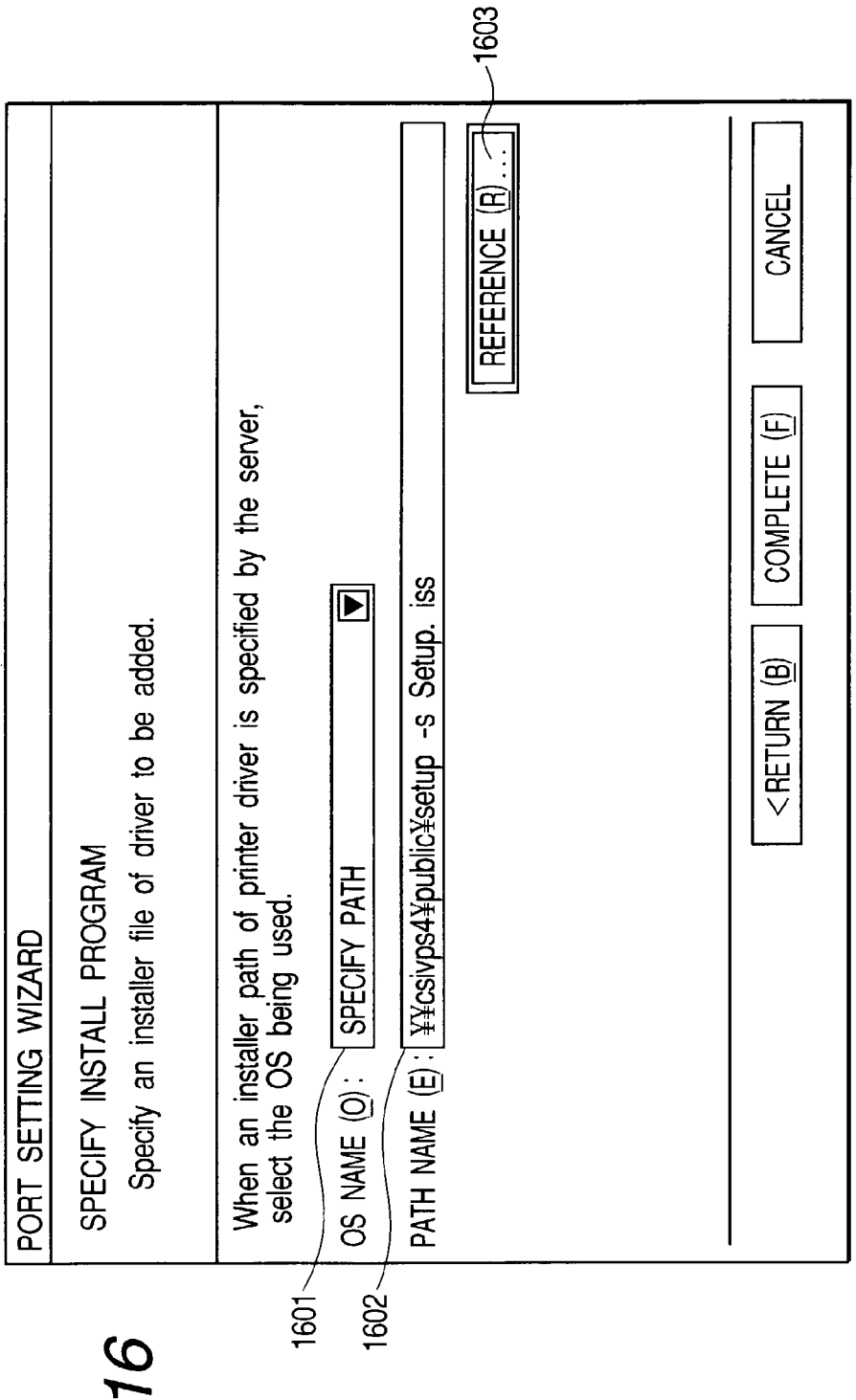
FIG. 16 shows a setting screen for setting a virtual printer by a driver installer.
Figure 17:
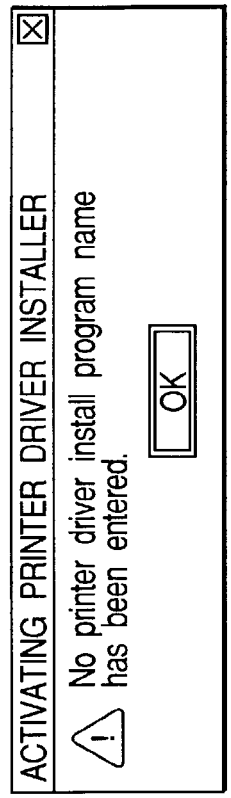
FIG. 17 shows an error screen displayed on the client device 501 in the process shown in FIG. 10.

FIG. 16 shows a setting screen on which the driver installer sets a virtual printer. Reference numeral 1602 denotes an installer path setting unit for specifying the path of the driver installer. The information about a driver installer is input into the unit. Reference numeral 1601 denotes an OS specification unit for inputting OS information about the client device 502 when a driver installer path is specifies in the installer path setting unit 1602.

When it is determined in S1006 that the UNC path of the driver installer is received, the UNC path received in the installer path setting unit 1602 is automatically displayed as a 'path name', and the process in S1008 is performed. In S1008, the virtual printer module recognizes whether or not the UNC path name of the installation configuration file has been specified. If the virtual printer module recognizes in S1008 that the UNC path name of the installation configuration file has not been specified, then control is passed to S1009. If the 'completion' button has been pressed in S1009 in the FIG. 16, the client module 506 activates the driver installer through the UNC path input into the installer path specification unit. The port information and the driver name are input into the input unit (omitted in the attached drawings) of the activated driver installer, and control is passed to S1111.

If the client module 506 recognizes the UNC path name of the installation configuration file in S1008, then the client module 506 specifies the path name of the installation configuration information as an option of the activate instruction of the driver installer. The installer path setting unit 1602 in FIG. 16 shows the state in which the following settings are automatically performed in the installer path setting unit 1602.

¥¥csivps4¥public¥setup-s¥¥ccvps20¥public ¥setup.iss

The '¥¥csivps4¥public¥setup' is a UNC path name which is a preferable example of the information about the storage space of a driver installer. The '¥¥csips4¥public¥setup.iss' is a UNC path name which is a preferable example of the storage space of the installation configuration file. Subsequently, if the 'complete' button is pressed on the screen shown in FIG. 16, then the virtual printer module calls the driver installer through the path displayed in the installer path setting unit 1602. That is, the client device 501 accesses the server device 502 through the path of the driver installer, and requests the driver installer. In response to the request, the server device 502 calls the driver installer requested by the client device 501 from the memory, and controls the OS for transmission. Therefore, the command '¥¥csivps4¥public¥setup-s¥¥csivps4¥public¥setup.iss' is input into the OS of the client device. When the instruction is input into the OS, the OS activates the driver installer in the automatic install mode. The activated driver installer reads an installation configuration file (S1010), and performs the process in S1110. Thus, the client device 501 receives information from the server device 502.

The installation configuration file stores the information input into the driver installer of the server device in S902 shown in FIG. 9. As described above, the installation configuration file stores the necessary information for setting a driver and use a peripheral device such as a printer driver name, a UNC path name of an existing printer required as an output port, the IP address of the printer, the information about a TCP port, etc.

In S1110, the driver installer recognizes the installation configuration information input into the driver installer, performs an installing process according to the recognized installation configuration information (S1012), thereby terminating the process. Practically, in S1012, an output port to be assigned to a virtual printer being generated is set, and assigns the port name of the virtual printer in the installation configuration information. Then, according to the driver name specified in the installation configuration file and the port information, a driver having the corresponding driver name is installed after the selection from a printer driver group received with the driver installer from the server device, and performs a port setting process.

In the above mentioned embodiment, a port of a virtual printer and a virtual printer name are used, but it is obvious that a printer driver can be installed based on the actual printer name and output port.

Other Embodiments

The processes shown in FIGS. 7 to 10 according to the present embodiments are performed by preferable examples of the information processing apparatus, that is, the server device 101, the client devices 102 to 104, or examples of them, that is, the server device 502, and client device 501 using the program externally installed. In this case, the present invention can be applied in the case in which information groups including a program can be provided for each information processing apparatus from an external storage medium through a storage medium such as CD-ROM, flash memory, an FD, etc. or a network.

As described above, it is obvious that the objects of the present invention can also be attained by providing a storage medium storing a program code of software for realizing the function of the above mentioned embodiments for a system or a device, and by a computer (or the CPU and MPU) of the system or the device reading and executing the program code stored in the storage medium.

In this case, the program code itself read from the storage medium realizes a new function of the present invention, and the storage medium storing the program code configures the present invention. A storage medium for providing a program code can be, for example, a floppy disk, a hard disk, an optical disk, a magneto-optic disk, a DVD, CD-ROM, a magnetic tape, a non-volatile memory card, ROM, EEPROM, etc.

Furthermore, it is also obvious that, by executing the program code read by the computer, not only the functions of the above mentioned embodiments can be realized, but also a part or all of the actual processes can be performed by the OS (operating system), etc. operating in the computer at an instruction of the program code, and the functions of the above mentioned embodiments can be realized in the processes. Furthermore, it is obvious that the present invention also includes the case in which after the program code read from the storage medium is written to the memory in the function extension board inserted into the computer or the function extension unit connected to the computer, a part or all of the actual processes are performed by the CPU, etc. in the function extension board and the function extension unit at an instruction of the program code, and the functions of the embodiments can be realized in the processes.

As described above, according to the present invention, when a driver is set up in a client device, complicated user operations can be successfully reduced.

Furthermore, since the client device is notified of the information about the installation configuration information provided for a predetermined server device, it is not necessary to input complicated information including the installation configuration information when a driver is installed in the client device.

Additionally, since the information about calling an installer is transmitted to the client device, there is an advantage that it is not necessary for a user to input complicated data when the installer corresponding to a peripheral device to be set is called.

What is claimed is:

1. An information processing apparatus which communicates with a peripheral device and a server device; comprising:
   acquisition control means for controlling a process of obtaining configuration location information about a storage location of installation configuration information, and for controlling a process of obtaining module location information about a storage location of a driver information setting module, wherein the installation configuration information is generated when driver information for control of the peripheral device is installed in the server device, and wherein the driver information setting module comprises a module for performing a driver installing process from the server device;
   discrimination means for discriminating whether the module location information has been obtained by said acquisition control means, when a new driver is installed using the driver information setting module;
   display means for displaying a start command which includes the configuration location information, the module location information, and instruction information indicating starting of the driver information setting module in an automatic installation mode, if said discrimination means discriminates that the module location information has been obtained by the acquisition control means; and
   start instruction means for obtaining the installation configuration information and the driver information setting module from the server device based on the configuration location information and the module location information, and for instructing starting of the driver information setting module based on the instruction information,
   wherein the driver information setting module sets driver information based on the installation configuration information.

2. The information processing apparatus according to claim 1, wherein the installation configuration information includes a network address of the peripheral device.

3. The information processing apparatus according to claim 1, wherein the driver information setting module includes a driver installer, and the module location information includes a UNC path name of the driver installer.

4. The information processing apparatus according to claim 1, wherein the installation configuration information includes port information about a data destination of said information processing apparatus.

5. The information processing apparatus according to claim 4, wherein said information processing apparatus transmits data to be processed by the peripheral device to the peripheral device through a peripheral device management device.

6. The information processing apparatus according to claim 1, wherein said display means displays a blank space for the start command for starting the driver information setting module, if said discrimination means discriminates that the module location information has not been obtained, wherein the start command can be entered in the blank space with an input means provided in said information processing apparatus.

7. An information processing method of communicating with a peripheral device and a server device; comprising:
   an acquisition control step of controlling a process of obtaining configuration location information about a storage location of installation configuration information, and for controlling a process of obtaining module location information about a storage location of a driver information setting module, wherein the installation configuration information is generated when driver information for control of the peripheral device is installed in the server device, and wherein the driver information setting module comprises a module for performing a driver installing process from the server device;
   a discrimination step of discriminating whether the module location information has been obtained by said acquisition control step, when a new driver is installed using the driver information setting module;
   a display step of displaying a start command which includes the configuration location information, the module location information, and instruction information indicating starting of the driver information setting module in an automatic installation mode, if said discrimination step discriminates that the module location information has been obtained by the acquisition control step; and
   a start instruction step of obtaining the installation configuration information and the driver information setting module from the server device based on the configuration location information and the module location information, and for instructing starting of the driver information setting module based on the instruction information,
   wherein the driver information setting module sets driver information based on the installation configuration information.

8. The information processing method according to claim 7, wherein said acquisition control step controls a process of obtaining the driver information setting module based on the information about the storage location thereof.

9. The information processing method according to claim 8, wherein said driver information setting module obtained by said acquisition control step sets driver information based on the installation configuration information.

10. The information processing method according to claim 7, wherein the installation configuration information includes a network address of the peripheral device.

11. The information processing method according to claim 7, wherein the driver information setting module includes a driver installer, and the module location information includes a UNC path name of the driver installer.

12. The information processing method according to claim 7, wherein the installation configuration information includes port information about a data destination of said information processing apparatus.

13. The information processing method according to claim 12, further comprising a step of transmitting data to be processed by the peripheral device directly to the peripheral device via the port in the port information.

14. The information processing method according to claim 12, further comprising a step of transmitting data to be processed by the peripheral device to the peripheral device through a peripheral device management device.

15. The information processing method according to claim 7, wherein said display step displays a blank space for the start command for starting the driver information setting module, if said discrimination step discriminates that the module location information has not been obtained, wherein the start command can be entered in the blank space with an input means provided in said information processing apparatus.

16. A control program executed in an information processing apparatus communicating with a peripheral device and a server device, wherein said control program is stored on a medium readable by the information processing apparatus, and wherein when executed by the information processing apparatus said control program comprises:
an acquisition control step of controlling a process of obtaining configuration location information about a storage location of installation configuration information, and for controlling a process of obtaining module location information about a storage location of a driver information setting module, wherein the installation configuration information is generated when driver information for control of the peripheral device is installed in the server device, and wherein the driver information setting module comprises a module for performing a driver installing process from the server device;
a discrimination step of discriminating whether the module location information has been obtained by said acquisition control step, when a new driver is installed using the driver information setting module;
a display step of displaying a start command which includes the configuration location information, the module location information, and instruction information indicating starting of the driver information setting module in an automatic installation mode, if said discrimination step discriminates that the module location information has been obtained by the acquisition control step; and
a start instruction step of obtaining the installation configuration information and the driver information setting module from the server device based on the configuration location information and the module location information, and for instructing starting of the driver information setting module based on the instruction information,
wherein the driver information setting module sets driver information based on the installation configuration information.

17. A network system having a peripheral device, a server device, and a client device,
wherein said peripheral device is connected to the client device;
wherein said server device comprises:
management means for managing installation configuration information, wherein the installation configuration information is generated when driver information for control of the peripheral device is installed in a system; and
transmission control means for controlling a process of transmitting information about a storage location of the installation configuration information managed by said management means, for controlling a process of transmitting information about a storage location of a driver information setting module, wherein the driver information setting module comprises a module for installation of driver information to the client device, and wherein the driver information setting module is executed by the client device to install the driver information in the client device by using content of the installation configuration information;
wherein the process of transmitting is controlled in response to a request from the client device;
and wherein said client device comprises:
acquisition control means for controlling a process of obtaining configuration location information about a storage location of the installation configuration information, and for controlling a process of obtaining configuration location information about a storage location of a driver information setting module, wherein the installation configuration information is generated when driver information for control of the peripheral device is installed in the server device, and wherein the driver information setting module comprises a module for performing a driver installing process from the server device;
discrimination means for discriminating whether the module location information has been obtained by said acquisition control means, when a new driver is installed using the driver information setting module;
display means for displaying a start command which includes the configuration location information, the module location information, and instruction information indicating starting of the driver information setting module in an automatic installation mode, if said discrimination means discriminates that the module location information has been obtained; and
start instruction means for obtaining the installation configuration information and the driver information setting module from the server device based on the configuration location information and the module location information, and for instructing starting of the driver information setting module based on the instruction information,
wherein the driver information setting module sets driver information based on the installation configuration information.

18. An information processing apparatus that communicates with a peripheral device and a server device, comprising:
acquisition control means for controlling a process of obtaining configuration location information about a storage location of installation configuration information, and for controlling a process of obtaining module location information about a storage location of a driver information setting module, wherein the installation configuration information is generated when driver information for control of the peripheral device is installed in the server device, and wherein the driver information setting module comprises a module for performing a driver installing process from the server device;
first discrimination means for discriminating whether the module location information has been obtained by said acquisition control means, when a new driver is installed using the driver information setting module;
second discrimination means for discriminating whether the configuration location information has been obtained by said acquisition control means, when a new driver is installed using the driver information setting module;
display means for displaying a start command which includes the configuration location information and the module location information, if said first discrimination means discriminates that the module location information has been obtained and if said second discrimination means discriminates that the configuration location information has been obtained, and displaying a start command which includes the module location information but does not include the configuration location information, if said first discrimination means discriminates that the module location information has been obtained and if said second discrimination means discriminates that the configuration location information has not been obtained, wherein if said first discrimination means discriminates that the module location information has not been obtained, said display means displays neither the configuration location information nor the module location information, but displays information for allowing input of a start command with an input means provided in said information processing apparatus; and start instruction means for instructing starting of the driver information setting module based on the start command displayed by said display means, wherein the driver information setting module sets driver information based on the installation configuration information obtained based on the configuration location information, if the start command includes the configuration location information.

19. An information processing method for an information processing apparatus that communicates with a peripheral device and a server device; comprising:

an acquisition control step for controlling a process of obtaining configuration location information about a storage location of installation configuration information, and for controlling a process of obtaining module location information about a storage location of a driver information setting module, wherein the installation configuration information is generated when driver information for control of the peripheral device is installed in the server device, and wherein the driver information setting module comprises a module for performing a driver installing process from the server device;

a first discrimination step for discriminating whether the module location information has been obtained by said acquisition control step, when a new driver is installed using the driver information setting module;

a second discrimination step for discriminating whether the configuration location information has been obtained by said acquisition control step, when a new driver is installed using the driver information setting module;

a display step for displaying a start command which includes the configuration location information and the module location information, if said first discrimination step discriminates that the module location information has been obtained and if said second discrimination step discriminates that the configuration location information has been obtained, and displaying a start command which includes the module location information but does not include the configuration location information, if said first discrimination step discriminates that the module location information has been obtained and if said second discrimination step discriminates that the configuration location information has not been obtained, wherein if said first discrimination step discriminates that the module location information has not been obtained, said display step displays neither the configuration location information nor the module location information, but displays information for allowing input of a start command with an input means provided in said information processing apparatus; and a start instruction step for instructing starting of the driver information setting module based on the start command displayed by said display step, wherein the driver information setting module sets driver information based on the installation configuration information obtained based on the configuration location information, if the start command includes the configuration location information.

20. A control program executed in an information processing apparatus that communicates with a peripheral device and a server device, wherein said control program is stored on a medium readable by the information processing apparatus, and wherein when executed by the information processing apparatus said control program comprises:

an acquisition control step for controlling a process of obtaining configuration location information about a storage location of installation configuration information, and for controlling a process of obtaining module location information about a storage location of a driver information setting module, wherein the installation configuration information is generated when driver information for control of the peripheral device is installed in the server device, and wherein the driver information setting module comprises a module for performing a driver installing process from the server device;

a first discrimination step for discriminating whether the module location information has been obtained by said acquisition control step, when a new driver is installed using the driver information setting module;

a second discrimination step for discriminating whether the configuration location information has been obtained by said acquisition control step, when a new driver is installed using the driver information setting module;

a display step for displaying a start command which includes the configuration location information and the module location information, if said first discrimination step discriminates that the module location information has been obtained and if said second discrimination step discriminates that the configuration location information has been obtained, and displaying a start command which includes the module location information but does not include the configuration location information, if said first discrimination step discriminates that the module location information has been obtained and if said second discrimination step discriminates that the configuration location information has not been obtained, wherein if said first discrimination step discriminates that the module location information has not been obtained, said display step displays neither the configuration location information nor the module location information, but displays information for allowing input of a start command with an input means provided in said information processing apparatus; and a start instruction step for instructing starting of the driver information setting module based on the start command displayed by said display step, wherein the driver information setting module sets driver information based on the installation configuration information obtained based on the configuration location information, if the start command includes the configuration location information.

* * * * *

UNITED STATES PATENT AND TRADEMARK OFFICE
CERTIFICATE OF CORRECTION

PATENT NO. : 7,231,435 B2 Page 1 of 1
APPLICATION NO. : 10/281197
DATED : June 12, 2007
INVENTOR(S) : Ohta It is certified that error appears in the above-identified patent and that said Letters Patent is hereby corrected as shown below:

COLUMN 2:
Line 32, "advantageous" should read -- advantages --.

COLUMN 5:
Line 12, "user" should read -- a user --;
Line 24, "program, etc." should be deleted; and
Line 63, "numeral denotes" should read -- numeral 302 denotes --.

COLUMN 6:
Line 27, "instructs" should read -- instruct --.

COLUMN 9:
Line 12, " "¥¥ccivps20¥public¥ " should read -- '¥¥ccivps20¥public¥' --.

COLUMN 11:
Line 37, "¥¥csivps4¥public¥setup-r' " should read -- ¥¥csivps4¥public¥setup-r --.

COLUMN 12:
Line 6, "instruction" should read -- instruction is given --.

COLUMN 13:
Line 15, "specifies" should read -- specified --; and
Line 67, "and use a" should read -- and using a --.

Signed and Sealed this

Third Day of June, 2008

JON W. DUDAS
*Director of the United States Patent and Trademark Office*